(12) United States Patent
Stinebring et al.

(10) Patent No.: US 9,744,983 B2
(45) Date of Patent: Aug. 29, 2017

(54) STEERING COLUMN ASSEMBLY

(71) Applicant: STEERING SOLUTIONS IP HOLDING CORPORATION, Saginaw, MI (US)

(72) Inventors: Scott A. Stinebring, Auburn, MI (US); Terry E. Burkhard, Bay City, MI (US); Robert D. Maida, Pinconning, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 67 days.

(21) Appl. No.: 14/973,957

(22) Filed: Dec. 18, 2015

(65) Prior Publication Data
US 2017/0174249 A1 Jun. 22, 2017

(51) Int. Cl.
*B62D 1/185* (2006.01)

(52) U.S. Cl.
CPC .................... *B62D 1/185* (2013.01)

(58) Field of Classification Search
CPC .................................... B62D 1/185
See application file for complete search history.

(56) References Cited

U.S. PATENT DOCUMENTS

| | | | | |
|---|---|---|---|---|
| 2008/0242057 A1* | 10/2008 | Bauer | ............... | H01L 21/3081 438/464 |
| 2009/0145258 A1* | 6/2009 | Davies | ............... | B62D 1/184 74/495 |
| 2010/0139438 A1* | 6/2010 | Appleyard | ............ | B62D 1/184 74/493 |
| 2010/0275721 A1* | 11/2010 | Davies | ............... | B62D 1/184 74/493 |
| 2011/0227323 A1* | 9/2011 | Osuka | ............... | B62D 1/195 280/779 |
| 2015/0353122 A1* | 12/2015 | Davies | ............... | B62D 1/184 24/542 |
| 2016/0001809 A1* | 1/2016 | Kingston-Jones | ..... | B62D 1/195 74/492 |
| 2016/0059879 A1* | 3/2016 | Tagaya | ............... | B62D 1/184 74/493 |

* cited by examiner

Primary Examiner — Darlene P Condra
(74) Attorney, Agent, or Firm — Cantor Colburn LLP

(57) ABSTRACT

A steering column assembly includes a jacket assembly, a mounting bracket, and a first telescope guide. The jacket assembly defines a first guide slot. The mounting bracket is disposed on the jacket assembly and has a first portion disposed opposite a second portion and a third portion extending between the first portion and the second portion. The first portion has a first rail received within the first guide slot. The first telescope guide is disposed between the first guide slot and the first rail.

20 Claims, 5 Drawing Sheets

US 9,744,983 B2

STEERING COLUMN ASSEMBLY

BACKGROUND OF THE INVENTION

The present invention relates to a steering column assembly.

Telescoping steering column assemblies permit linear movement between movable components and stationary components of the steering column assembly. Complex geometries and additional components of the steering column assembly aid in meeting difficult vehicle packaging requirements and providing a substantially clearance free fit between the movable components and the stationary components of the steering column assembly. The additional components may include a de-lashing mechanism, a series of springs and wedges, or the like.

SUMMARY OF THE INVENTION

According to an embodiment of the present invention, a steering column assembly is provided. The steering column assembly includes a jacket assembly, a mounting bracket, and a first telescope guide. The jacket assembly defines a first guide slot. The mounting bracket is disposed on the jacket assembly and has a first portion disposed opposite a second portion and a third portion extending between the first portion and the second portion. The first portion has a first rail received within the first guide slot. The first telescope guide is disposed between the first guide slot and the first rail.

According to another embodiment of the present invention, a steering column assembly is provided. The steering column assembly includes a jacket assembly, a mounting bracket, a first telescope guide, and a second telescope guide. The jacket assembly has a body and a support portion disposed on a central element extending from the body. The body, the central element, and the support portion defines a first guide slot and a second guide slot disposed opposite the first guide slot. The mounting bracket has a first portion disposed opposite a second portion. The first portion has a first rail received within the first guide slot. The second portion has a second rail received within the second guide slot. The first telescope guide is disposed between the first guide slot and the first rail. The second telescope guide is disposed between the second guide slot and the second rail.

According to yet another embodiment of the present invention, a method of manufacturing a steering column assembly is provided. The method of manufacturing includes providing a mounting bracket having a first portion, a second portion, a third portion. The first portion has a first rail. The second portion is disposed opposite the first portion and has a second rail. The third portion extends between the first portion and the second portion. The method of manufacturing further includes providing a second jacket assembly that receives a first jacket assembly. The second jacket assembly includes a body and a support portion disposed on a central element that extends from the body. The body, the support portion, and the central element define a first guide slot and a second guide slot disposed opposite the first guide slot. The method of manufacturing further includes inserting the second jacket assembly within the mounting bracket such that the first rail is received within the first guide slot and the second rail is received within the second guide slot. The method of manufacturing further includes inserting a first telescope guide between the first guide slot and the first rail and inserting a second telescope guide between the second guide slot and the second rail. The first guide slot and the second guide slot each include a first wall, a second wall disposed opposite the first wall, and a third wall extending between a first wall proximal end and a second wall proximal end. The third wall has a raised section extending towards a first wall distal end and a second wall distal end.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely exemplary of the present disclosure that is embodied in various and alternative forms. The figures are not necessarily to scale; some features is exaggerated or minimized to show details of particular components. Therefore, specific structural and functional details disclosed herein are not to be interpreted as limiting, but merely as a representative basis for teaching one skilled in the art to variously employ the present disclosure.

Figure 1:
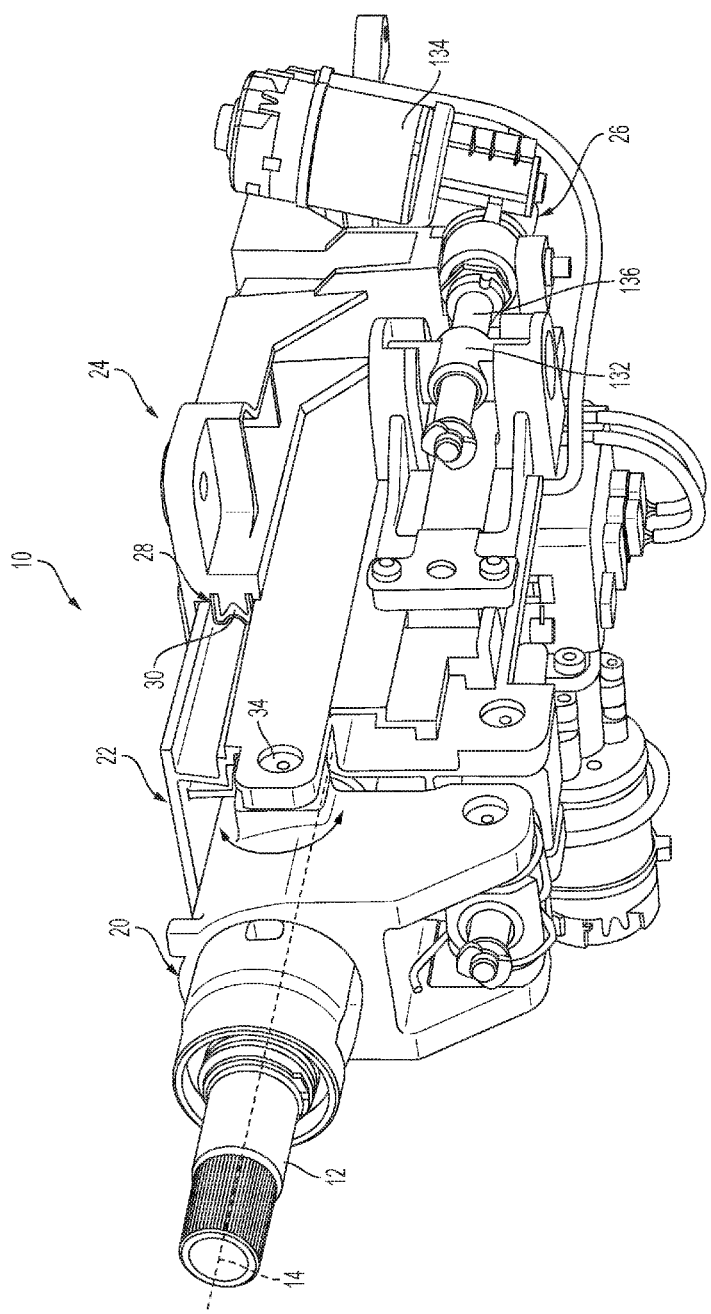
FIG. 1 is a perspective view of a steering column assembly.

Referring to FIG. 1, a steering column assembly 10 is shown. The steering column assembly 10 is provided with a vehicle, such as a motor vehicle like a truck, bus, farm equipment, military transport or weaponry vehicle, or cargo loading equipment for land, air, or marine vessels. The steering column assembly 10 is operatively connected to a steering wheel that may articulate at least one vehicle wheel in response to rotation of the steering wheel.

The steering column assembly 10 is configured as a power tilt and/or telescoping steering column assembly. In at least one embodiment, the steering column assembly 10 is a manual steering column assembly or a rake column assembly provided with a telescoping feature. The steering column assembly 10 includes a steering shaft 12 extends longitudinally along a steering column axis 14. At least a portion of the steering column assembly 10 is movable along the steering column axis 14 or is pivotable/tiltable relative to the steering column axis 14. The steering column assembly 10 includes a first jacket assembly 20, a second jacket assembly 22, a mounting bracket 24, a telescope actuator assembly 26, a telescope guide assembly 28, and a plastic component 30.

The steering column assembly 10 is operatively connected to a vehicle structure by the mounting bracket 24. Throughout this specification, the term "attach," "attachment," "connected", "coupled," "coupling," "mount," or "mounting" shall be interpreted to mean that one structural component or element is in some manner connected to or contacts another element—either directly or indirectly through at least one intervening structural element—or is integrally formed with the other structural element. Accordingly, it should be appreciated that the first jacket assembly 20 and/or the second jacket assembly 22 may be connected to the mounting bracket 24 in several different ways using at least one different structural element interconnecting the first jacket assembly 20 and/or the second jacket assembly 22 and mounting bracket 24 to each other.

The first jacket assembly 20 extends along the steering column axis 14 and is operatively engaged with the steering wheel. The first jacket assembly 20 is at least partially received within the second jacket assembly 22. The first jacket assembly 20 or the tilt head is connected to the second jacket assembly 22 by at pivot pin or a tilt pin 34. The first jacket assembly 20 is tiltable or pivotable about an axis defined by the tilt pin 34 relative to the second jacket assembly 22. The first jacket assembly 20 and the second jacket assembly 22 are movable between a retracted position and an extended position along the steering column axis 14 with respect to each other.

Figure 2:
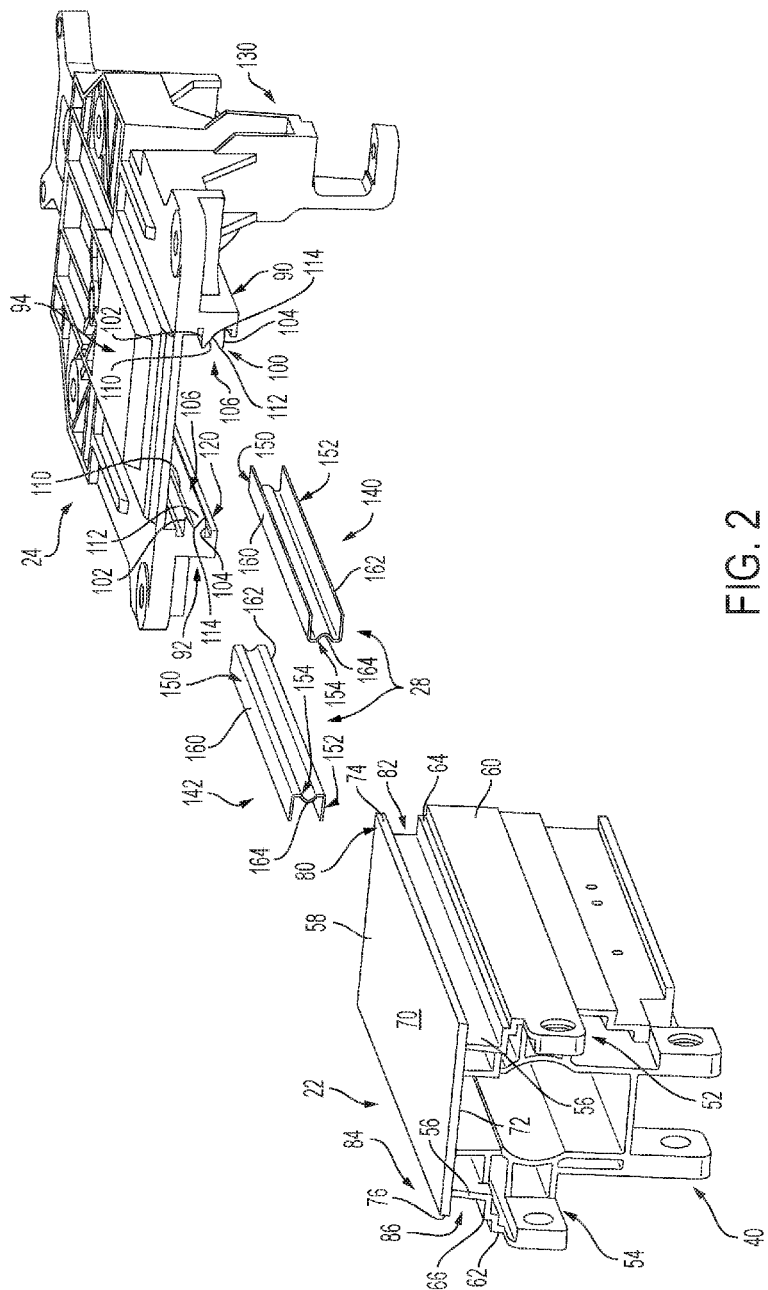
FIG. 2 is a disassembled view of a portion of the steering column assembly.

Referring to FIGS. 1 and 2, the second jacket assembly 22 extends along the steering column axis 14. The second jacket assembly 22 has a body 40 that defines a first side 52, a second side 54, a central element 56, and a support portion 58.

The first side 52 is disposed opposite the second side 54. The first side 52 includes a first jacket stiffness rail 60. The first jacket stiffness rail 60 is disposed between a top portion of the body 40 and a bottom portion of the body 40. The first jacket stiffness rail 60 extends away from the steering column axis 14 in a first direction. The first stiffness rail 60 defines an opening that receives the pivot pin 34.

The second side 54 includes a second jacket stiffness rail 62. The second jacket stiffness rail 62 is disposed between the top portion of the body 40 and the bottom portion of the body 40. The second jacket stiffness rail 62 extends away from the steering column axis 14 in a second direction disposed opposite the first direction. The second stiffness rail 62 defines an opening that receives the pivot pin 34.

The central element 56 is disposed above the first side 52 and the second side 54. The central element 56 is disposed substantially parallel to but not coplanar with the first side 52 and the second side 54. The central element 56 is disposed closer to the steering column axis 14 than the first side 52 and the second side 54. A first stepped surface 64 extends between a top portion of the first side 52 and a bottom portion of the central element 56. A second stepped surface 66, disposed opposite the first stepped surface 64, extends between a top portion of the second side 54 and a bottom portion of the central element 56. The central element 56 extends towards the support portion 58.

The support portion 58 is disposed above the first side 52, the second side 54, and the central element 56. The support portion 58 engages the central element 56. The support portion 58 includes a first support surface 70, a second support surface 72, a third support surface 74, and a fourth support surface 76.

The first support surface 70 faces towards a top inner surface of the mounting bracket 24. The second support surface 72 is disposed opposite the first support surface 70. The third support surface 74 extends between the first support surface 70 and the second support surface 72. The fourth support surface 76 is disposed opposite the third support surface 74. The fourth support surface 76 extends between the first support surface 70 and the second support surface 72.

The third support surface 74 is disposed farther from the steering column axis 14 than the central element 56. The combination of the third support surface 74 and a portion of the first support surface 70 and a portion of the second support surface 72 that extends beyond the central element 56 in the first direction defines a first jacket lip 80. The combination of the first jacket lip 80, the central element 56, and at least one of the first stepped surface 64 and a top of the first side 52 defines a first guide slot 82. The first guide slot 82 is disposed between the first jacket lip 80 and the first jacket stiffness rail 60.

The fourth support surface 76 is disposed farther from the steering column axis 14 than the central element 56. The combination of the fourth support surface 76 and a portion of the first support surface 70 and a portion of the second support surface 72 that extends beyond the central element 56 and the second direction, defines a second jacket lip 84. The combination of the second jacket lip 84, the central element 56, and at least one of the second stepped surface 66 and a top of the second side 54 defines a second guide slot 86. The second guide slot 86 is disposed between the second jacket lip 84 and the second jacket stiffness rail 62.

The mounting bracket 24 is disposed on the second jacket assembly 22. The mounting bracket 24 has a first portion 90, a second portion 92, and a third portion 94. The first portion 90 is disposed opposite the second portion 92. The third portion 94 extends between upper portions of the first portion 90 and the second portion 92.

The first portion 90 defines a first rail 100. The first rail 100 extends towards the second jacket assembly 22. The first rail 100 is received within the first guide slot 82. The first rail 100 includes a first surface 102, a second surface 104, and an engagement surface 106.

The first surface 102 is disposed substantially parallel to the first support surface 70 and the second support surface 72. The second surface 104 is spaced apart from and is disposed opposite the first surface 102. The second surface 104 is disposed substantially parallel to the first support surface 70 and the second support surface 72.

The engagement surface 106 extends between the first surface 102 and the second surface 104. The engagement surface 106 includes a first segment 110 and a second segment 112. The first segment 110 extends from an end of the first surface 102 towards an intersection point 114. The second segment 112 extends from an end of the second surface 104 towards the intersection point 114. In at least one embodiment the engagement surface 106 has a generally V-shaped cross section.

The second portion 92 defines a second rail 120. The second rail 120 extends towards the second jacket assembly 22. The second rail 120 is received within the second guide slot 86. The second rail 120 has a substantially similar configuration as the first rail 100. As such, the second rail 120 includes a first surface 102, a second surface 104, and an engagement surface 106.

The first surface 102 is disposed substantially parallel to the first support surface 70 and the second support surface 72. The second surface 104 is spaced apart from and is disposed opposite the first surface 102. The second surface 104 is disposed substantially parallel to the first support surface 70 and the second support surface 72.

The engagement surface 106 extends between the first surface 102 and the second surface 104. The engagement surface 106 includes a first segment 110 and a second segment 112. The first segment 110 extends from an end of the first surface 102 towards an intersection point 114. The second segment 112 extends from an end of the second surface 104 towards the intersection point 114. In at least one embodiment the engagement surface 106 has a generally V-shaped cross section.

The first portion 90 defines an actuator mounting bracket 130 that receives the telescope actuator assembly 26. The actuator mounting bracket 130 is spaced apart from the first rail 100 and the second rail 120. The actuator mounting bracket 130 is disposed below the first rail 100 and the second rail 120.

The telescope actuator assembly 26 is configured to translate the first jacket assembly 20 and the second jacket assembly 22 along the steering column axis 14 relative to each other. The telescope actuator assembly 26 includes a telescope drive bracket 132, a telescope actuator 134, and a lead screw 136. The telescope drive bracket 132 is coupled to the second jacket assembly 22. The telescope actuator 134 is spaced apart from the telescope drive bracket 132. The telescope actuator 134 is received within the actuator mounting bracket 130.

The telescope actuator 134 is operatively connected to the telescope drive bracket 132 by the lead screw 136. The lead screw 136 extends from the telescope actuator 134 through an aperture of the telescope drive bracket 132 and engages a jackscrew nut of the telescope drive bracket 132. The telescope actuator 134 imparts rotary motion to the lead screw 136 and the telescope drive bracket 132 converts the rotary motion of the lead screw 136 into linear motion to translate the first jacket assembly 20 and the second jacket assembly 22 along the steering column axis 14 relative to each other and the mounting bracket 24. The telescope actuator 134 may be in electronic actuator, hydraulic actuator, pneumatic actuator, or the like.

The linear movement of the first jacket assembly 20 and the second jacket assembly 22 relative to the mounting bracket 24 may be impacted by clearances between the moving components and the stationary components of the steering column assembly 10. In an attempt to minimize the clearance and present a structural lash free interface between the moving components and the stationary components of the steering column assembly 10 the telescope guide assembly 28 and the plastic component 30 are provided.

The telescope guide assembly 28 includes a first telescope guide 140 and a second telescope guide 142. The first telescope guide 140 and the second telescope guide 142 may be light weight extrusions, an injection molded plastic component, or the like having a low coefficient of friction. The first telescope guide 140 and the second telescope guide 142 may be a teflon coated bronze mesh, an injection molded thin wall slider bearing, a combination thereof, or the like. The first telescope guide 140 and the second telescope guide 142 are light weight extrusions may be made of a material different than the material of the first jacket assembly 20, the second jacket assembly 22, or the mounting bracket 24. The first telescope guide 140 is inserted into the second jacket assembly 22 such that the first telescope guide 140 is disposed between the first guide slot 82 and the first rail 100. The first telescope guide 140 includes a first wall 150, a second wall 152, and a third wall 154.

The first wall 150 is disposed substantially parallel to the first surface 102 of the first rail 100. A top surface of the first wall 150 defines a first bearing surface 160. The first bearing surface 160 is a sliding surface that engages the second support surface 72 of the support portion 58 of the body 40 of the second jacket assembly 22.

The second wall 152 is spaced apart from the first wall 150. The second wall 152 is disposed substantially parallel to the first wall 150. The second wall 152 is disposed substantially parallel to the second surface 104 of the first rail 100. A bottom surface of the second wall 152 defines a second bearing surface 162. The second bearing surface 162 is a sliding surface that engages the first stepped surface 64 of the body 40 of the second jacket assembly 22.

The third wall 154 extends between a proximal end of the first wall 150 and a proximal end of the second wall 152. The third wall 154 is disposed opposite a distal end of the first wall 150 and a distal end of the second wall 152.

At least a portion of the third wall 154 is disposed substantially parallel to the central element 56 of the body 40. The third wall 154 includes a raised section 164. The raised section 164 is a generally arcuate section that extends towards the distal end of the first wall 150 and the distal end of the second wall 152. The raised section 164 extends towards and is spaced apart from engagement surface 106 of the first rail 100.

The raised section 164 is expandable towards or away from at least one of the central element 56 of the body 40 of the second jacket assembly 22 and the engagement surface 106. The raised section 164 expands to accommodate shape variances between the guide slots and the rails. The underside of the raised section 164 that faces towards the central element 56 of the body 40 of the second jacket assembly 22 may be used as a grease reservoir to maintain grease for the life of the steering column assembly 10.

The second telescope guide 142 is inserted into the second jacket assembly 22 such that the second telescope guide 142 is disposed between the second guide slot 86 and the second rail 120. The second telescope guide 142 has a substantially similar configuration as the first telescope guide 140. Includes a first wall 150, a second wall 152, and a third wall 154 that includes a raised section 164 that extends towards and is spaced apart from the engagement surface 106 of the second rail 120.

Figure 3:
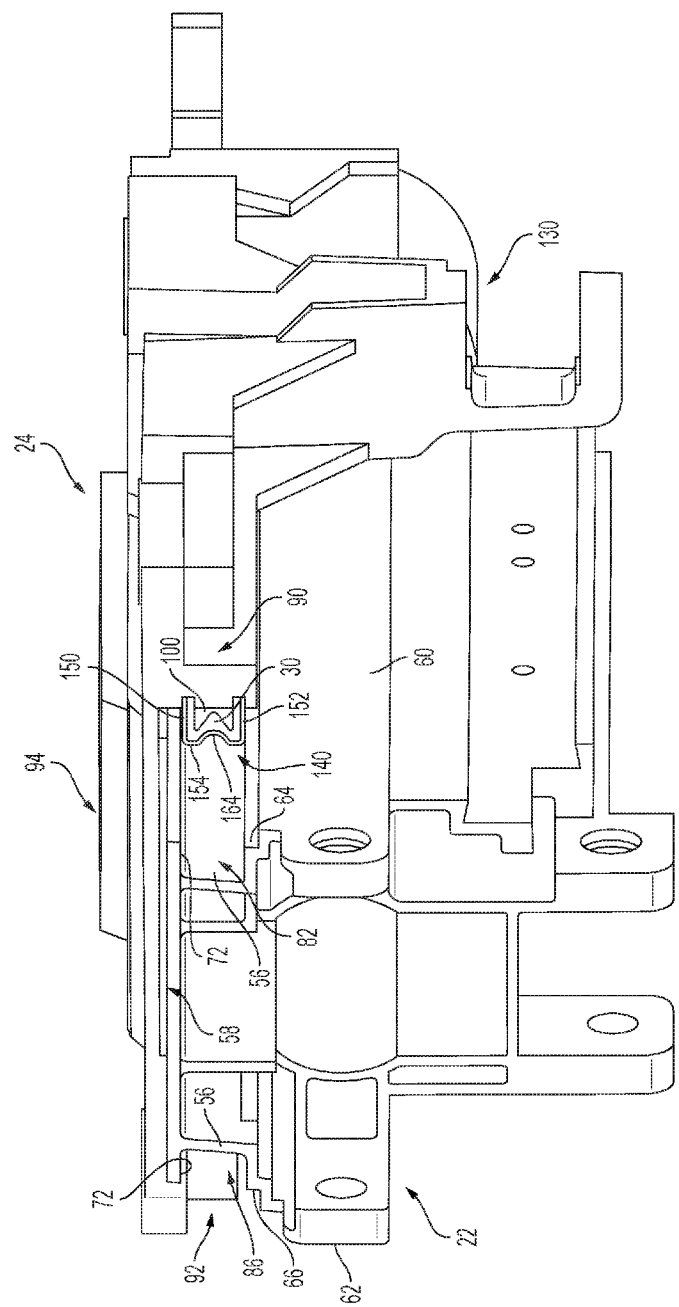
FIG. 3 is a perspective view of a portion of the steering column assembly.
Figure 4:
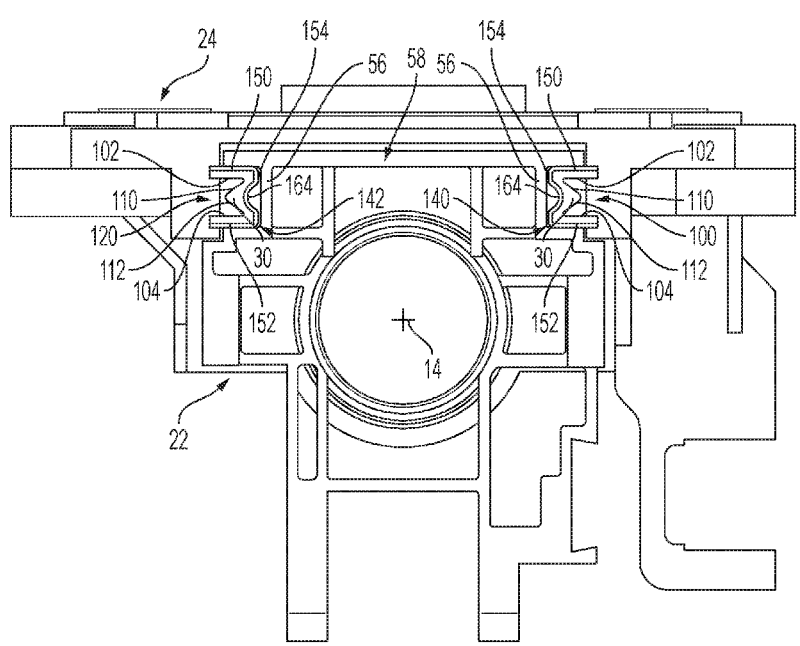
FIG. 4 is a front view of a portion of the steering column assembly.

Referring to FIGS. 3 and 4, the plastic component 30 is inserted between the first rail 100 of the mounting bracket 24 and the first telescope guide 140. The plastic component 30 is injected within a cavity formed by the first telescope guide 140 and the first rail 100. The plastic component 30 is configured to adhere the first telescope guide 140 to the first rail 100 of the mounting bracket 24. The shape of the plastic component 30 may vary depending on vehicle requirements such as space constraints, stiffness required, stroke load required, etc.

The plastic component 30 is an expandable material. The plastic component 30 fills gaps or spaces between the first telescope guide 140 and the first rail 100 and the second telescope guide 142 and the second rail 120 to inhibit relative movement between the first and second telescope guides 140, 142 and the second jacket assembly 22.

The plastic component 30 is inserted between the second rail 120 of the mounting bracket 24 and the second telescope guide 142. The plastic component 30 is injected within a cavity formed by the second telescope guide 142 and the second rail 120. The plastic component 30 adheres the second telescope guide 142 to the second rail 120. The shape of the plastic component 30 may vary depending on vehicle requirements such as space constraints, stiffness required, stroke load required, etc.

The plastic component 30 is inserted between the rails and the telescope guides by a variety of methods including injection such that the plastic component 30 is an injected plastic that fixes the first telescope guide 140 and the second telescope guide 142 to the first rail 100 and the second rail 120 of the mounting bracket 24, respectively. The first telescope guide 140, the second telescope guide 142, and the plastic component 30 remain stationary with the mounting bracket 24 during translation or telescope motion of at least one of the first jacket assembly 20 and the second jacket assembly 22. The first telescope guide 140, the second telescope guide 142, and the plastic component 30 provide a tight, lash free interface that permits or allows translation or telescope motion of at least one of the first jacket assembly 20 and the second jacket assembly 22.

The injection of the plastic component 30 between the first telescope guide 140 and the first rail 100 and the second telescope guide 142 and the second rail 120 enables a match fit or the mating between the second jacket assembly 22 and the mounting bracket 24 to create a low stroke load, highly stiff or rigid steering column assembly 10 without performing expensive machining processes.

The plastic component 30 conforms to the shape of the first telescope guide 140 and the first rail 100. The conformance permits the self-adjustment of the first telescope guide 140 to the mating component size, i.e. the first rail 100, during the injection process. The first telescope guide 140 seals off a leak path of the liquid plastic injected during the plastic injection process.

The plastic component 30 conforms to the shape of the second telescope guide 142 and the second rail 120. The conformance permits the self-adjustment of the second telescope guide 142 to the mating component size, i.e. the second rail 120, during the injection process. The second telescope guide 142 seals off a leak path of liquid plastic injected during the plastic injection process.

Figure 5:
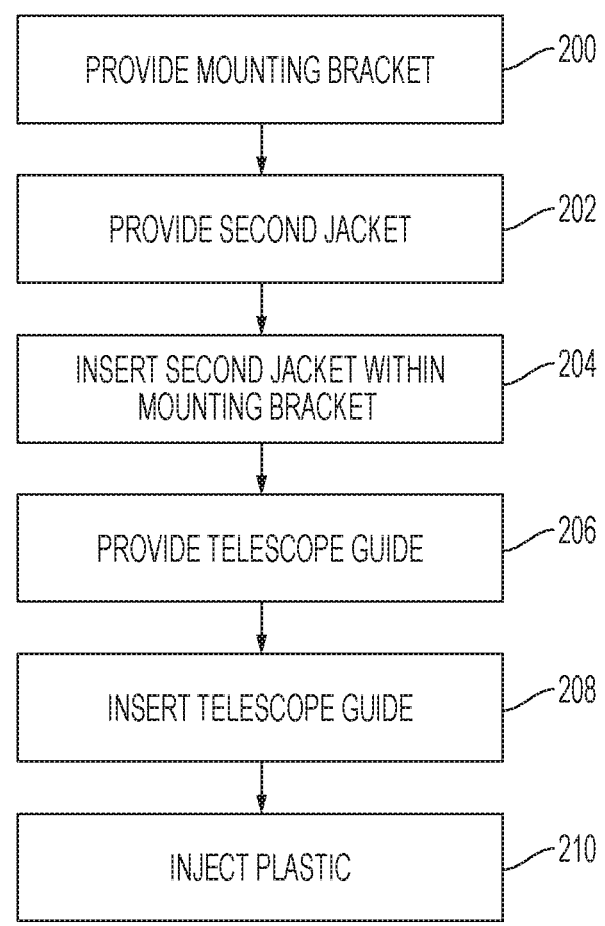
FIG. 5 is a flowchart of a method of manufacturing a steering column assembly.

Referring to FIG. 5, a method of manufacturing a steering column assembly is shown. A mounting bracket 24 is provided at block 200. The mounting bracket 24 may be fixedly positioned during the manufacturing process. A second jacket assembly 22 is provided at block 202. A first jacket assembly 20 may also be provided that is inserted into the second jacket assembly 22 such that the combination of the first jacket assembly 20 and the second jacket assembly 22 are provided at block 202. The second jacket assembly 22 is inserted within the mounting bracket 24 at block 204. A first telescope guide 140 and a second telescope guide 142 are provided at block 206. The first telescope guide 140 is inserted between a first guide slot 82 of the second jacket assembly 22 and a first rail 100 of the mounting bracket 24 and the second telescope guide 142 is inserted between a second guide slot 86 of the second jacket assembly 22 and a second rail 120 of the mounting bracket 24 at block 208. In at least one embodiment, the first telescope guide 140 and the second telescope guide 142 is substantially simultaneously inserted between the second jacket assembly 22 and the mounting bracket 24.

A plastic component 30 is injected between the telescope guides to fixedly position the telescope guides relative to the rails at block 210. The plastic component 30 is injected between the first telescope guide 140 and the first rail 100 of the mounting bracket 24 to join the first telescope guide 140 to the first rail 100 of the mounting bracket 24. The plastic component 30 is injected between the second telescope guide 142 and the second rail 120 of the mounting bracket 24 to join the second telescope guide 142 to the second rail 120 of the mounting bracket 24. In at least one embodiment, the plastic component 30 is injected substantially simultaneously between the telescope guides and the rails.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering column assembly comprising:
   a jacket assembly defining a first guide slot;
   a mounting bracket disposed on the jacket assembly, the mounting bracket having a first portion disposed opposite a second portion and a third portion extending between the first portion and the second portion, the first portion having a first rail received within the first guide slot; and
   a first telescope guide disposed between the first guide slot and the first rail.

2. The steering column assembly of claim 1, wherein the first guide slot is disposed between a first jacket lip and a first jacket stiffness rail.

3. The steering column assembly of claim 1, wherein the first telescope guide has a first wall disposed opposite a second wall and a third wall extending between the first wall and the second wall.

4. The steering column assembly of claim 3, wherein the first rail has a first surface disposed opposite a second surface and an engagement surface extending between the first surface and the second surface.

5. The steering column assembly of claim 4, wherein the first wall is disposed substantially parallel to the first surface and the second wall is disposed substantially parallel to the second surface.

6. The steering column assembly of claim 4, further comprising a plastic component injected within a cavity formed by the first telescope guide and the first rail.

7. The steering column assembly of claim 6, wherein the plastic component engages at least a portion of the first wall, the second wall, the third wall, the first surface, the second surface, and the engagement surface.

8. The steering column assembly of claim 7, wherein the plastic component fixedly positions the first telescope guide relative to the first rail.

9. A steering column assembly comprising:
   a jacket assembly having a body, a central element extending from the body, and a support portion disposed on the central element, the body, the central element, and the support portion defines a first guide slot and a second guide slot disposed opposite the first guide slot;
   a mounting bracket having a first portion disposed opposite a second portion, the first portion having a first rail configured to be received within the first guide slot and the second portion having a second rail configured to be received within the second guide slot;
   a first telescope guide disposed between the first guide slot and the first rail; and
   a second telescope guide disposed between the second guide slot and the second rail.

10. The steering column assembly of claim 9, wherein the first telescope guide has a first wall disposed opposite a second wall and a third wall extending between the first wall and the second wall.

11. The steering column assembly of claim 10, wherein the third wall has a raised section extending towards a first wall distal end and a second wall distal end.

12. The steering column assembly of claim 11, wherein the first rail has a first surface disposed opposite a second surface and an engagement surface extending between the first surface and the second surface.

13. The steering column assembly of claim 12, wherein the engagement surface includes a first segment extending from the first surface towards an intersection point and a second segment extending from the second surface towards the intersection point.

14. The steering column assembly of claim 13, wherein the raised section extends towards and is spaced apart from the engagement surface.

15. The steering column assembly of claim 9, further comprising a plastic component injected between the first telescope guide and the first rail.

16. The steering column assembly of claim 15, further comprising a plastic component injected between the second telescope guide and the second rail.

17. The steering column assembly of claim 16, wherein during operation of a linear actuator the jacket assembly is configured to translate relative to the mounting bracket along a first bearing surface of the first telescope guide and a second bearing surface of the second telescope guide.

18. A method of manufacturing a steering column assembly comprising:
   providing a mounting bracket, the mounting bracket that includes:
   a first portion having a first rail;
   a second portion disposed opposite the first portion, the second portion having a second rail;
   a third portion extending between the first portion and the second portion;
   providing a second jacket assembly that receives a first jacket assembly, the second jacket assembly that includes:
   a body,
   a central element extending from the body, and
   a support portion disposed on the central element, the body, the central element, and the support portion defining a first guide slot and a second guide slot;
   inserting the second jacket assembly within the mounting bracket such that the first rail is received within the first guide slot and the second rail is received within the second guide slot;
   inserting a first telescope guide between the first guide slot and the first rail;
   inserting a second telescope guide between the second guide slot and the second rail, each of the first telescope guide and the second telescope guide includes:
   a first wall;
   a second wall disposed opposite the first wall; and
   a third wall extending between a first wall proximal end and a second wall proximal end, the third wall having a raised section extending towards a first wall first end and a second wall first end.

19. The method of claim 18, further comprising injecting a plastic component between the first telescope guide and the first rail to join the first telescope guide to the first rail.

20. The method of claim 18, further comprising injecting a plastic component between the second telescope guide and the second rail to join the second telescope guide to the second rail.

* * * * *